C. S. PARRISH.
FRICTION WHEEL.
APPLICATION FILED JAN. 29, 1918.
1,288,667.
Patented Dec. 24, 1918.
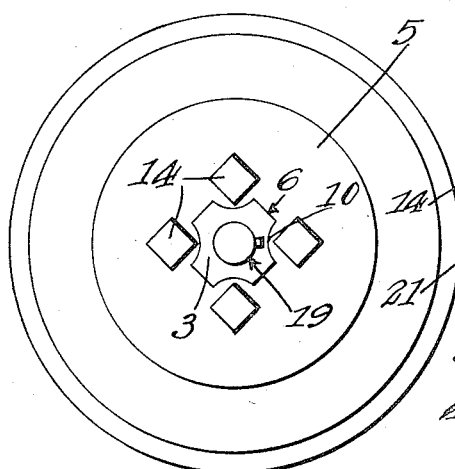
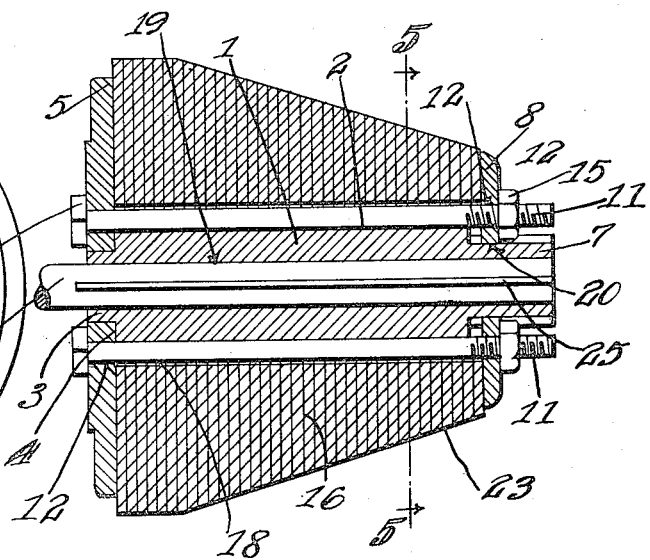
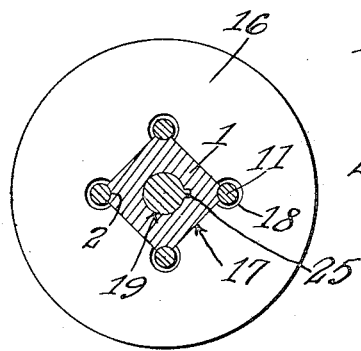
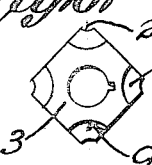
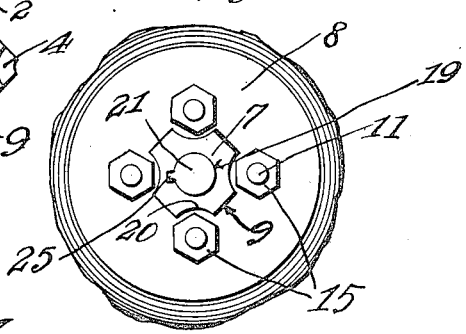
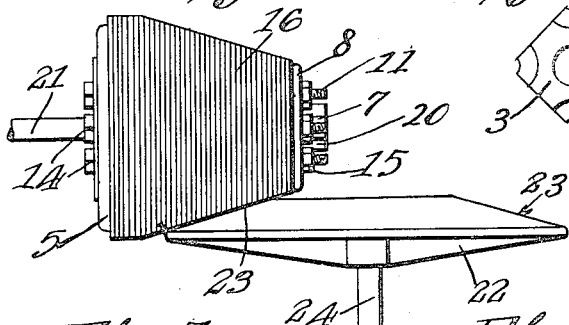
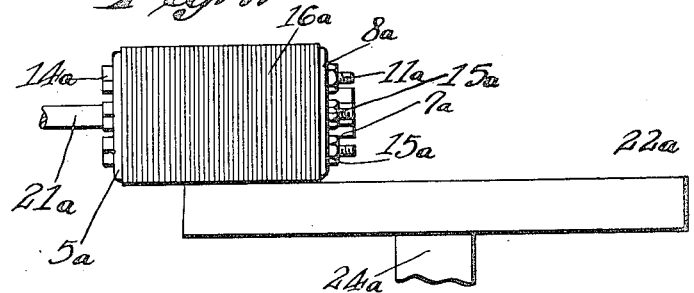
Inventor
C. S. Parrish
Witness

UNITED STATES PATENT OFFICE.

CLARENCE S. PARRISH, OF BLAINE, WASHINGTON.

FRICTION-WHEEL.

1,288,667.

Specification of Letters Patent.  Patented Dec. 24, 1918.

Application filed January 29, 1918. Serial No. 214,435.

*To all whom it may concern:*

Be it known that I, CLARENCE S. PARRISH, a citizen of the United States, residing at Blaine, in the county of Whatcom and State of Washington, have invented a new and useful Friction-Wheel, of which the following is a specification.

The device forming the subject matter of this application is a friction wheel, adapted to be used in a well known manner in connection with a friction disk, the friction wheel ordinarily but not necessarily being of frusto-conical or tapered form.

When a tapered friction wheel is used in connection with a friction disk, the paper layers of the friction wheel wear away, after a time, adjacent the smaller end of the friction wheel. The ideal way in which to remedy this difficulty would be to remove some of the paper layers from the smaller end of the friction wheel, crowd the remaining papers over toward the smaller end of the wheel, and apply new papers at the larger end of the wheel. This operation, however, is not feasible with certain known forms of friction wheels, since the head at the larger end of the wheel is formed integrally with the hub, it being necessary to remove all of the papers, when, as a matter of fact, only a few of the papers, at the smaller end of the wheel actually need to be taken off.

Another disadvantage incident to friction wheels of the known form is that separate holes have been made in paper layers, for the hub and for the bolts which connect the heads, and, as a consequence, it has been exceedingly difficult, and practically impossible, to remove the paper layers, without tearing and injuring them. To remedy this difficulty, it is proposed to form, in the paper layers, an approximately central opening adapted to receive the hub, and to form openings adapted to receive the connecting bolts, the last specified openings communicating with the central opening, the operation of the placing or changing of the papers taking place with a marked degree of ease, and without injuring the paper layers, as a consequence.

In addition to the feature last above mentioned, this invention aims to provide a wheel of the type mentioned, having removable heads, combined with means for drawing the heads together on the hub, the construction being such that a few of the worn paper layers at the smaller end of the wheel may be removed, the remaining papers being crowded over toward the smaller end of the wheel, and the necessary number of paper layers being added at the larger end of the wheel.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Figure 1 shows in side elevation, a friction wheel constructed in accordance with the present invention, the same coöperating with a friction disk;

Fig. 2 is a longitudinal section of the friction wheel;

Fig. 3 is an elevation showing the larger end of the wheel;

Fig. 4 is an elevation showing the smaller end of the wheel;

Fig. 5 is a cross section taken on the line 5—5 of Fig. 2;

Fig. 6 is an elevation looking at one end of the hub; and

Fig. 7 is an elevation, similar to Fig. 1, but showing a slightly modified form of the invention.

In carrying out the present invention there is provided a hub 1 which, preferably, but not necessarily, is of rectangular cross section. At its corners, the hub 1 is provided with longitudinally extended concaved channels 2. The hub terminates at one extremity at one cruciform end 3 defining a shoulder 4. The numeral 5 denotes a main head abutting against the shoulder 4 and having a cruciform opening 6 in which the end 3 fits, the outer end of the element 3 being flush, preferably, with the outer surface of the main head 5. The hub 1 has a cruciform end 7, constructed like the end 3, saving for the fact that the end 7 is somewhat longer than the end 3, so as to extend an appreciable distance beyond the outer face of an auxiliary head 8, having a cruciform opening 9 in which the end 7 is received, the head 8 being of smaller diameter than the head 5. The concavities 9 of the end 3 and the concavities 20 of the end 7 are alined, longitudinally of the hub 1, with the channels 2.

Bolts 11 pass through openings 12 in the heads 5 and 8, the bolts extending along the channels 2. The head 14 of the bolts engage the member 5, the nuts 15 on the bolts being received rotatably in the concavities 20 of the end 7, and engaging the head 8.

A plurality of sheets or layers of paper or like material, denoting by the numeral 16, are placed on the hub 1 between the heads 5 and 8, the layers decreasing in diameter, so that the surface of the wheel has a conical or tapered form, as shown in Figs. 1 and 2. Since the end 7 of the hub 1 projects beyond the outer surface of the head 8, the head 8 may be forced inwardly by the nuts 15, thereby to compact the layers 15, the head 8 sliding on the end 7 of the hub 1.

Referring to Fig. 5, it will be observed that each paper layer 16 is provided with a main opening 17, receiving the hub 1, there being auxiliary openings 18 at the corners of the opening 17, the openings 18 communicating with the opening 17 and receiving the bolts 11.

Since the openings 18 communicate with the opening 17 there is, in effect, but a single hole in each layer 16. As a consequence, the layers 16 may be manufactured more cheaply than would be possible otherwise, and, further, the construction above described facilitates the placing of the layers on the hub 1 and the removal of the layers therefrom. In former constructions, so far as I am advised as to state of the art, one relatively large opening has been fashioned in the layers, to receive the hub, a number of separate openings being made to receive the bolts, the result of such a construction being a layer which is expensive to make and equally expensive to handle in use, both on account of difficulty in manipulation, and on account of liability to injury.

The hub 1 has a central passage 19 in which a shaft 21 may be keyed as shown at 25. The wheel constructed as above described is adapted to coöperate with the beveled surface 23 of a friction disk 22 mounted on a shaft 24 in the well known manner.

The construction of the device is such that when the edges of the paper layers 16 wear away, the head 8 may be detached, certain of the smaller layers 16 being removed, the remaining layers being crowded over to the right (Fig. 1), and the desired number of larger layers 16 being mounted on the hub 1 inside of the head 5, the latter being removed.

In Fig. 7 of the drawings, a modified form of the invention is shown. Parts hereinbefore described have been designated by numerals previously used, with the suffix "a."
In Fig. 7, the only modification contemplated is that the heads $8^a$ and $5^a$ are of the same diameter, all of the paper layers $16^a$ being of the same diameter, and the wheel, as a whole, being of cylindrical form, rather than of tapered form as shown in Fig. 1.

Having thus described the invention, what is claimed is:—

1. In a friction wheel adapted for use with a disk, a hub having reduced ends defining shoulders; removable heads slidable on said ends, longitudinally of the hub, and adapted to coöperate with the shoulders; layers on the hub, between the heads; and tightening devices connecting heads and passing through the layers.

2. In a friction wheel adapted for use with a disk, a hub; heads on the ends of the hub; tightening devices connecting the heads; and layers between the heads, each layer having a main opening receiving the hub, and auxiliary openings receiving the tightening devices, the auxiliary openings communicating with the main opening.

In testimony that I claim the foregoing as my own, I have hereto affixed my signature in the presence of two witnesses.

CLARENCE S. PARRISH.

Witnesses:
GEORGE D. MONTFORT,
C. M. BROWN.